Nov. 7, 1961   R. R. HILL   3,007,533
TWO PIECE AGRICULTURAL SWEEP
Filed Nov. 18, 1957
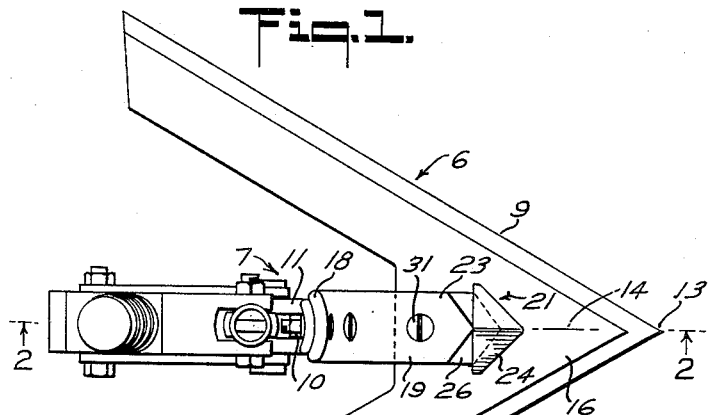
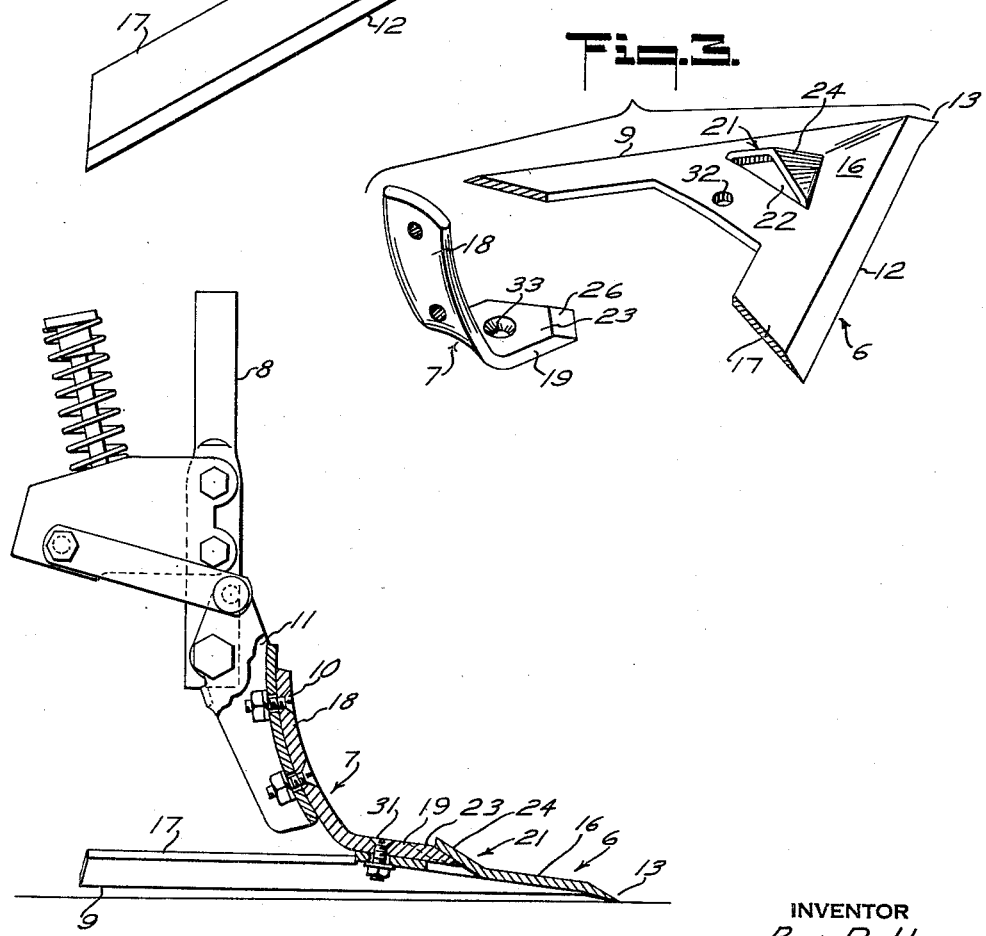
INVENTOR
Roy R. Hill
BY
Gardner & Zimmerman
ATTORNEYS

United States Patent Office 3,007,533
Patented Nov. 7, 1961

3,007,533
TWO PIECE AGRICULTURAL SWEEP
Roy R. Hill, Monterey Park, Calif., assignor to Orendorff Manufacturing Company, Fresno, Calif., a corporation of California
Filed Nov. 18, 1957, Ser. No. 697,101
7 Claims. (Cl. 172—730)

The invention relates to agricultural implements known as sweeps and in which the blade is designed to pass through the soil in a manner to avoid undue disruption of the soil surface. More particularly, the present invention is directed towards a type of agricultural sweep in which the blade is made separate of the supporting stem and is arranged for releasable attachment thereto. The present application constitutes a continuation in part of my copending application, Serial No. 482,703, filed January 19, 1955, now Patent No. 2,882,983.

An object of the present invention is to form the blade and stem in such manner that they may be quickly attached and securely held together without the need of a plurality of bolts or similar fastening means.

Another object of the invention is to provide a sweep of the type described in which the means of securing the blade and stem together provide a guide for insuring proper assembly of such members and retention in proper position during use of the sweep.

A further object of this invention is to provide a two-piece sweep in which the attaching means for the pieces will be subject to little strain during operation of the sweep, and at the same time the greater the load during operation the more effective attachment becomes.

A still further object of the invention is to provide a two-piece sweep in which the stem and blade and the means for attaching same, are so designed, that a minimum resistance will be imposed to the free flow of the earth thereby during the operation of the sweep, and the stem will be exposed to very little wear.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a top plan view of the two-piece sweep of my invention with the parts attached.

FIGURE 2 is a cross-sectional view of the sweep shown in FIGURE 1, the plane of the view being taken substantially along line 2—2 of FIGURE 1.

FIGURE 3 is a perspective view of the stem and blade of the sweep shown in detached relation.

As shown in the drawing, the sweep of the present invention comprises a sweep blade 6 formed separate of a supporting member such as the stem 7 but to which the blade is arranged to be attached. The stem as illustrated, is in turn attached to a supporting shank 8 which is carried by a vehicle or other apparatus for moving the sweep. The shank and the means of its attachment to the stem form no part of the present invention.

The blade 6 is of generally conventional configuration, and includes a pair of generally planar cutting edges 9 and 12 which diverge rearwardly from a point of juncture 13 forming the front end of the blade and positioned on the longitudinal center line thereof, such line being indicated by the reference numeral 14. The body of the blade is formed with a substantially solid forward portion 16 and integral wings 17 which extend rearwardly from the portion 16. The inner portions of the body, including the wings 17 are offset from outer portions which define the cutting edges so that the latter will be in a lower plane than the inner body portion. Also, as shown in the drawing, the forward body portion is inclined downwardly towards the point 13, and the tip portion is further inclined downwardly so that the cutting edges adjacent the tip portion may be lower than the remaining portion of the blade edges.

As will be clear from FIGURE 2 of the drawing, the stem 7 is generally in the form of a strap bent intermediate its ends to provide an upright portion 18 designed for attachment to the shank 8, and a substantially horizontally extending portion 19 adapted for attachment to the blade. The attachment of the stem to the shank may be simply effected by means of bolts 10 extending through the stem and a member 11 connected to the shank.

Provided on the upper surface of the body portion 16 of the blade is a socket member 21 having a cavity 22 with an open side facing rearwardly, the cavity being adapted to receive the forward end 23 of stem portion 19. The socket member is preferably made as an integral part of the blade and as here shown is formed by cutting a transverse slit through the body portion 16 and upsetting the material forwardly of the slit to provide a wall 24 of the socket.

Stem portion 19 is formed relatively flat so as to rest upon a correspondingly flat surface of the blade portion 16. The forward end 23 of the stem is provided with a bevelled face 26 and the socket wall 24 is formed at an angle such that when the stem end 23 is fully inserted therein, the bevelled face of the stem will engage the inner surface of the wall 24. In this manner, the stem end 23 may be firmly wedged in the socket and a rigid connection provided between the stem and blade. Desirably, the bevelled face 26 of the stem is formed of angularly related surfaces which not only incline downwardly and forwardly from top to bottom but diverge rearwardly as well, and in conformity with the foregoing, the wall 24 of the socket is bent accordingly. Thus, it will be noted that when the stem end is pressed into engagement in the socket, a compound wedging action is created tending to center the blade on the stem and locking the members against displacement during forward movement of the sweep.

Mainly for the purpose of holding the stem and blade together when the sweep is not being used, there is provided a bolt 31 which extends through aligned apertures 32 and 33 in the body portion 16 of the blade and stem portion 19 respectively. Preferably the aperture 32 is enlarged to permit slight variations in the relative positioning of the parts as may be required, and particularly as between the stem end and the socket during operation of the sweep.

It will now be clear that by reason of the foregoing construction, not only will the blade be firmly secured to the stem, but the greater the load imposed on the blade during the forward movement of the sweep the tighter will become the wedging engagement between the stem and blade, and therefore a more effective attachment.

An important feature of the invention is that in the present design the forward edge of the stem is arranged to be disposed entirely within the socket member. By reason of the foregoing, this portion of the stem which would otherwise be exposed to the eroding action of the earth thereagainst, is entirely shielded and protected against wear. Furthermore, the divergent shape and positioning of the socket wall 24 on the blade will cause earth passing over the blade to be deflected to either side of the stem thereby providing a smooth flow of the earth around the base of the stem and further protecting the stem against wear. It will further be observed that detachment of the blade for replacement or repair may be quickly and easily effected by removal of the single bolt 31 and then moving the blade to disengage the socket member from the stem portion 23.

What is claimed is:

1. In an agricultural sweep for attachment to a supporting shank or the like, a blade having a body portion with a relatively flat upper surface and cutting edges extending divergently from the forward end of said blade in a plane below said surface, a stem for said blade formed as a separate part thereof and having a first portion adapted for attachment to said shank and a second portion overlying said flat blade body surface and extending toward the forward end thereof, a socket member on the upper side of said blade body surface closed at one end and formed to receive and enclose the forward end of said second stem portion and having an open end facing rearwardly and through which said end portion may enter said socket member, the opposing surfaces of the second stem portion and inside of the socket being such that when engaged and the blade is subjected to a force tending to force the blade rearwardly said second portion will be forced downwardly over the blade.

2. Apparatus of the character described comprising a blade having a relatively flat upper surface and rearwardly diverging cutting edges in a plane below said surface, a blade-supporting stem having a first portion adapted to overlie and engage said blade surface, and means projecting upwardly from said upper surface defining a rearwardly opening socket on said blade, the distal end of said first portion of the stem being formed to firmly seat in said socket when inserted in the latter whereby said end will be substantially completely embraced by said socket defining means.

3. In a two piece agricultural sweep having a rearwardly diverging blade and a stem, means detachably connecting said blade and stem together comprising a wedge shaped socket member on an upper portion of said blade having its forward extremity adjacent that of the blade and having an opening rearwardly of the direction of operative movement of the sweep, the entire extent of the front end portion of said socket member extending from said upper portion of the blade and said stem having a forward portion of wedge shaped configuration and adapted for intimate wedging engagement with said socket member.

4. An agricultural sweep comprising a blade having a relatively flat central portion, a blade-supporting stem having angularly related portions with one of said portions having a relatively flat surface for seating on the central portion of said blade, said blade portion including a wedge shaped socket having a rearwardly directed entrance opening substantially immediately overlying said blade portion and a closed forward portion adjacent the forward end of the blade and with its external side forming a continuation of the upper surface of the flat central portion of the blade, the forward end of said one portion of the stem having a wedge shaped configuration and adapted for insertion in and wedging engagement with said socket while said flat surface on said stem is seated on the blade.

5. Apparatus as set forth in claim 4 in which said blade portion rearwardly of said socket and said one portion of said stem are in an area outside of said socket provided with apertures adapted to be aligned for receiving a bolt when the stem is inserted in said socket, and one of said holes being enlarged so as to permit relative adjustment between said stem and blade while maintaining the registration of said apertures.

6. A two piece agricultural sweep having a blade and a detachably connected stem, said blade including a central portion having a relatively flat upper surface, a part of said portion being transversely cut and deformed upwardly forwardly of said cut to define a rearwardly opening socket above said surface and a closed forward portion merging into said surface, said stem having a forward end portion of a configuration to provide a wedging engagement with said socket when inserted therein, and means positioned rearwardly of said socket engaging said blade and said stem and operative independent of said wedging action maintaining said stem and blade in attached relationship while permitting limited relative movement therebetween.

7. In an agricultural sweep, a blade comprising a relatively flat body having a pointed forward end and rearwardly diverging cutting edges, an integral portion of said body being upwardly offset into a pair of angularly related walls decreasing both laterally and in height in a forward direction to a point adjacent said forward end and defining a rearwardly opening socket, a blade-supporting stem having a first portion adapted for detachable connection to said blade and a second portion adapted for connection to a mechanism for moving the sweep, said first portion having a wedge shaped front end substantially complementary to the socket configuration whereby upon insertion of said front end into said socket the said end will be wedged and enclosed in the latter and the stem portion immediately rearwardly of the socket entering portion will be forced downwardly against the body immediately rearwardly of the offset thereof.

References Cited in the file of this patent

UNITED STATES PATENTS

| 817,696 | Dye | Apr. 10, 1906 |
| 2,595,353 | Graham | May 6, 1952 |
| 2,665,434 | Saunders | Jan. 12, 1954 |
| 2,699,104 | Jaeger | Jan. 11, 1955 |

FOREIGN PATENTS

| 6,966 | Australia | Apr. 13, 1928 |
| 6,666 | Great Britain | Feb. 20, 1892 |
| 8,873 | Great Britain | May 10, 1892 |
| 12,823 | Great Britain | Jan. 28, 1909 |